United States Patent
Singh et al.

(10) Patent No.: US 9,882,765 B1
(45) Date of Patent: Jan. 30, 2018

(54) PACKET NETWORK ACCESS POINT SELECTION BASED ON APPLICATION GROUP MEMBERSHIP

(75) Inventors: Jasinder Pal Singh, Olathe, KS (US); Sachin R. Vargantwar, Overland Park, KS (US); Maulik K. Shah, Overland Park, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1888 days.

(21) Appl. No.: 12/943,678

(22) Filed: Nov. 10, 2010

(51) Int. Cl.
*H04L 12/28* (2006.01)
*H04L 29/06* (2006.01)
*H04L 1/00* (2006.01)

(52) U.S. Cl.
CPC .............. *H04L 29/06* (2013.01); *H04L 1/00* (2013.01)

(58) Field of Classification Search
CPC .................................. H04L 1/00; H04L 29/06
USPC .................... 370/331, 390, 328, 401, 392
See application file for complete search history.

(56) References Cited

U.S. PATENT DOCUMENTS

| | | | |
|---|---|---|---|
| 6,834,050 B1 * | 12/2004 | Madour et al. ............... | 370/392 |
| 6,985,464 B2 * | 1/2006 | Harper et al. ................ | 370/331 |
| 6,987,764 B2 * | 1/2006 | Hsu ..................... | H04L 12/1886 370/331 |
| 7,043,253 B2 * | 5/2006 | Madour et al. ............... | 455/453 |
| 7,075,930 B1 * | 7/2006 | Chen et al. .................... | 370/392 |
| 7,191,231 B2 * | 3/2007 | Miernik ............. | H04L 12/5695 379/211.02 |
| 7,274,929 B1 * | 9/2007 | Banginwar .................... | 455/418 |
| 7,295,511 B2 | 11/2007 | Sharma et al. | |
| 7,346,684 B2 * | 3/2008 | Borella ......................... | 709/225 |
| 7,411,927 B1 * | 8/2008 | Bhalla et al. ................. | 370/352 |
| 7,426,195 B2 * | 9/2008 | Mukherjee et al. .......... | 370/328 |
| 7,756,010 B2 * | 7/2010 | Ramanan ............. | H04W 36/12 370/216 |
| 7,937,479 B2 * | 5/2011 | Blatherwick ..... | H04L 29/12094 709/227 |
| 8,059,557 B1 * | 11/2011 | Sigg et al. ..................... | 370/252 |
| 8,135,845 B2 * | 3/2012 | Lee et al. ...................... | 709/227 |
| 8,311,521 B1 * | 11/2012 | Paczkowski ........... | H04W 8/18 348/14.06 |
| 8,325,688 B2 * | 12/2012 | Mahendran et al. ......... | 370/338 |
| 8,635,300 B2 * | 1/2014 | Kvache ............... | H04L 12/2809 709/217 |
| 8,859,146 B2 * | 10/2014 | Marple et al. ................ | 429/221 |
| 2002/0083203 A1 * | 6/2002 | Lim .................... | H04L 12/1868 709/246 |
| 2003/0021252 A1 * | 1/2003 | Harper ................ | H04L 12/5695 370/338 |

(Continued)

*Primary Examiner* — Ricky Ngo
*Assistant Examiner* — Dewanda Samuel

(57) ABSTRACT

A method of operating a wireless packet access network comprises receiving, at a wireless network control system, a packet data request from an application in a wireless communication device, determining if the application is a member of a first application group or a second application group, and selecting a core packet network access point from a plurality of core packet network access points based on whether the application is a member of the first application group or the second application group. The method further comprises transmitting the packet data request to the selected core packet network access point to initiate access to a core packet network.

12 Claims, 6 Drawing Sheets

(56) References Cited

U.S. PATENT DOCUMENTS

| | | | |
|---|---|---|---|
| 2003/0235168 A1* | 12/2003 | Sharma | H04L 12/5602 370/338 |
| 2004/0081118 A1 | 4/2004 | Mukherjee et al. | |
| 2004/0248557 A1* | 12/2004 | Muratsu | 455/411 |
| 2005/0025116 A1* | 2/2005 | Chen | H04L 29/06 370/349 |
| 2006/0002329 A1* | 1/2006 | Madour | 370/328 |
| 2006/0045075 A1* | 3/2006 | Jiang et al. | 370/352 |
| 2006/0073826 A1* | 4/2006 | Miernik | 455/435.1 |
| 2006/0104214 A1* | 5/2006 | Borella | 370/252 |
| 2006/0109812 A1* | 5/2006 | Kim et al. | 370/329 |
| 2006/0179013 A1 | 8/2006 | Beliveau et al. | |
| 2006/0224720 A1* | 10/2006 | Bhogal et al. | 709/224 |
| 2007/0195788 A1* | 8/2007 | Vasamsetti | H04W 28/24 370/395.21 |
| 2008/0207187 A1* | 8/2008 | Maillard | H04M 1/72522 455/418 |
| 2011/0066731 A1* | 3/2011 | Falkena | G06F 9/505 709/226 |

* cited by examiner

| Application | Application Group |
|---|---|
| Application 1 | Second |
| Application 2 | First |
| . | . |
| . | . |
| . | . |
| Application N | Second |

PACKET NETWORK ACCESS POINT SELECTION BASED ON APPLICATION GROUP MEMBERSHIP

TECHNICAL BACKGROUND

Increasingly, wireless communication devices are used for data communications. In these data based communications, wireless communication devices often utilize software applications which enable a user to request, receive, view, and interact with the received data in many different ways. Internet browsers, instant messaging services, chat services, navigation applications, map programs, social network programs, weather services, email programs, as well as others, are commonly used in this manner on wireless communication devices.

Wireless communication devices establish communication sessions through wireless access networks. When a communication session is established for purposes of using one of the applications described above, the wireless access network establishes a packet based connection to an Internet protocol (IP) network where the requested data resides. Wireless access networks typically use a packet data server node (PDSN) to manage the interface between the wireless network and the IP networks. A point-to-point protocol (PPP) connection is established between the wireless communication device and the PDSN for purposes of the communication session. The PDSN routes packets between the wireless communication device and the packet data networks to satisfy the packet data requests from the application. Even though a wireless communication device may request data which is available on the Internet, the request is routed through and handled by the wireless access network.

Overview

A wireless packet access network includes several core packet network access points and a wireless network control system. The wireless network control system receives a packet data request from an application in a wireless communication device. The wireless network control system then determines if the application is a member of a first application group or a second application group and selects one of the core packet network access points based on which application group the application is a member of. The wireless network control system transmits the packet data request to the selected core packet network access point to initiate access to a core packet network.

BRIEF DESCRIPTION OF THE DRAWINGS

FIG. 6 illustrates an application group membership data structure.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
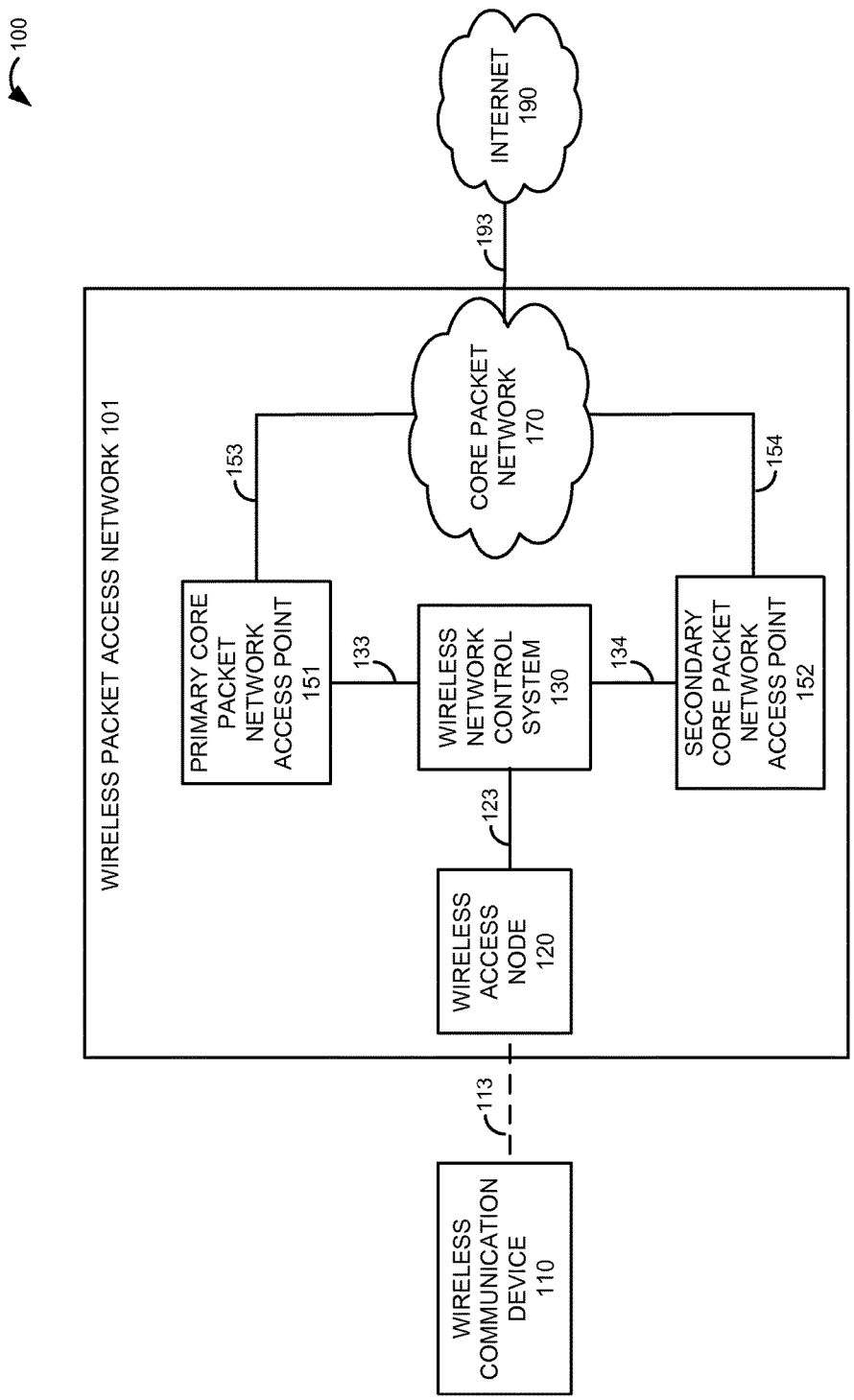
FIG. 1 illustrates a wireless communication system.

FIG. 1 illustrates wireless communication system 100. Wireless communication system 100 includes wireless packet access network 101, wireless communication device 110, and Internet 190. Wireless packet access network 101 includes wireless access node 120, wireless network control system 130, primary core packet network access point 151, secondary core packet network access point 152, and core packet network 170. Wireless communication device 110 and wireless access node 120 communicate over wireless link 113. Wireless access node 120 and wireless network control system 130 communicate over link 123. Wireless network control system 130 is in communication with primary core packet network access point 151 and secondary core packet network access point 152 over link 133 and link 134 respectively. Primary core packet network access point 151 is in communication with core packet network 170 over link 153. Secondary core packet network access point 152 is in communication with core packet network 170 over link 154. Core packet network 170 and Internet 190 are in communication over link 193.

Figure 2:
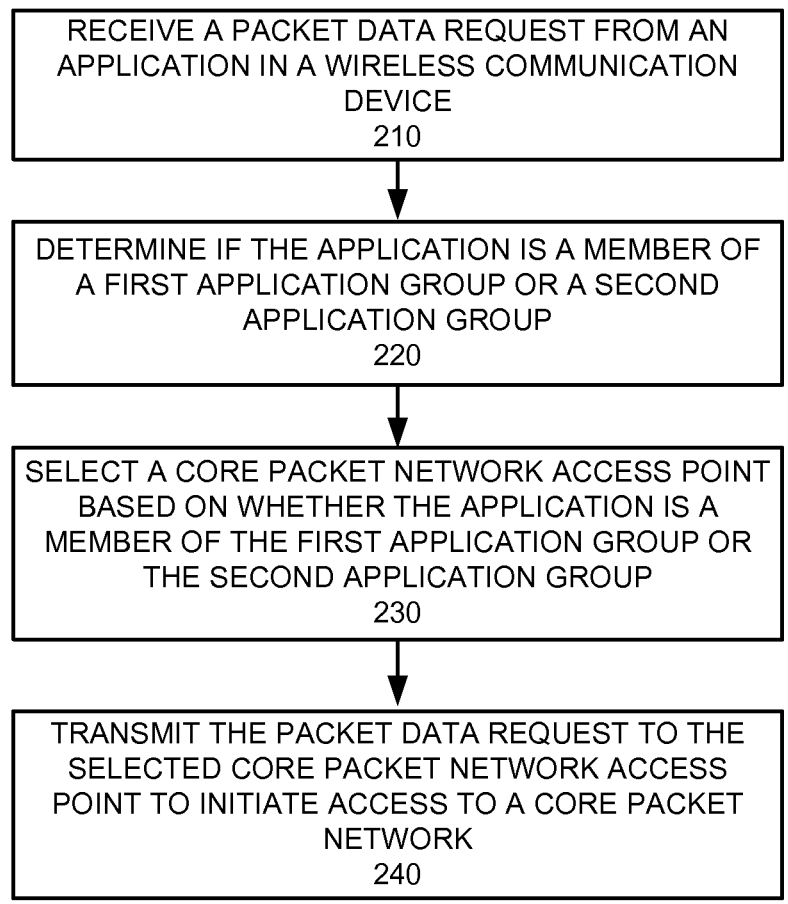
FIG. 2 illustrates an operation of the wireless communication system.

FIG. 2 illustrates a method of operation of wireless communication system 100. Wireless packet access network 101 receives a packet data request from an application in wireless communication device 110 through wireless access node 120 (210). Wireless network control system 130 receives the request and determines whether the application is a member of a first application group or a second application group (220). Wireless network control system 130 then selects a core packet network access point based on whether the application is a member of the first application group or the second application group (230). Wireless network control system 130 selects between primary core packet network access point 151 and secondary core packet network access point 152 and transmits the packet data request to the selected core packet network access point to initiate access to core packet network 170 (240).

In another example, wireless packet access network 101 selects the core packet network access point from a plurality of core packet network access points based on a data structure. The data structure associates the application with the first application group or the second application group. The data structure provides information which is used, in part, to make the determination as to whether the application is a member of the first application group or the second application group. The core packet network access point is then selected based on the application group membership as illustrated at step 230 of FIG. 2.

The data structure in the example above may be located in wireless network control system 130. Alternatively, this data structure may be located in wireless communication device 110. In the latter case, wireless communication device 110 uses the data structure to make the determination as to which application group the application is a member of and passes that information to wireless network control system 130 in conjunction with the packet data request. Wireless network control system 130 then selects a core packet network access point based on the application group membership as illustrated at step 230.

The operation of wireless communication system 100 as shown in FIG. 2 enables wireless packet access network 101 to utilize different core packet network access points when routing packet data requests from wireless communication device 110 to core packet network 170. Wireless packet access network 101 determines which core packet network access point to use for a particular request based on the identity of the application in wireless communication device 110 which originated the request. The group membership of the application is used to determine whether the request will be routed to core packet network 170 using primary core packet network access point 151 or secondary core packet network access point 152. In this way, requests from different applications, even different applications within the same wireless communication device, may be routed differently.

Referring back to FIG. 1, wireless communication device 110 comprises a telephone, transceiver, mobile phone, cellular phone, smartphone, computer, personal digital assistant (PDA), e-book, game console, mobile Internet device, wireless network interface card, media player, or some other wireless communication apparatus, including combinations thereof. Wireless communication device 110 includes Radio Frequency (RF) communication circuitry and an antenna. The RF communication circuitry typically includes an amplifier, filter, RF modulator, and signal processing circuitry of various types. Wireless communication device 110 may also include a user interface, memory device, software, central processing unit, or other communication components.

Wireless communication device 110 may utilize various wireless network communication protocols including Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other network protocol that facilitates communication between wireless communication device 110 and wireless access node 120.

Wireless access node 120 comprises RF communication circuitry and an antenna. The RF communication circuitry typically includes an amplifier, filter, RF modulator, and signal processing circuitry of various types. Wireless access node 120 may also comprise a router, server, memory device, software, processing circuitry, cabling, power supply, network communication interface, structural support, or other communication components. Wireless access node 120 may be a base station, Internet access node, telephony service node, wireless data access point, or some other wireless communication system, including combinations thereof. Wireless access node 120 may utilize a variety of network protocols including CDMA, GSM, UMTS, HSPA, EV-DO, EV-DO rev. A, 3GPP LTE, WiMAX, Wi-Fi, Bluetooth, Internet, telephony, some other communication format, or a combination thereof.

Wireless network control system 130 comprises a processing system and a communication interface. Wireless network control system 130 may also include other components such as a server, data storage system, memory, cabling, software, and power supply. Wireless network control system 130 may reside in a single device or may be distributed across multiple devices. Wireless network control system 130 may be a discrete system or may be integrated within other systems, including other systems within wireless communication system 100.

Primary core packet network access point 151 and secondary core packet network access point 152 each comprise a processing system and a communication interface. Each core packet network access point may also include other components such as a server, router, data storage system, memory, cabling, software, and power supply. Both primary core packet network access point 151 and secondary core packet network access point 152 may reside in a single device or may be distributed across multiple devices. Each may be a discrete system or may be integrated within other systems, including other systems within wireless communication system 100.

Core packet network 170 is the core packet network of wireless packet access network 101 and may comprise a router, gateway, telecommunication switch, server, processing system, data storage device, or other communication equipment or systems for providing communication and data services. Core packet network 170 could also comprise a communication node, telephony switch, Internet router, network gateway, computer system, data storage system, communication link, or other type of communication equipment, including combinations thereof. Core packet network 170 may also include other networks including optical networks, asynchronous transfer mode (ATM) networks, packet networks, local area networks (LAN), metropolitan area networks (MAN), wide area networks (WAN), or other network topologies, equipment, or systems, including combinations thereof. Core packet network 170 may be configured to communicate over metallic, wireless, or optical links. Core packet network 170 may be configured to use time-division multiplexing (TDM), Internet Protocol (IP), Ethernet, optical networking, wireless protocols, communication signaling, or some other communication format, including combinations thereof.

Wireless communication link 113 uses air or space as the transport medium. Communication over wireless communication link 113 may be based on various protocols, such as CDMA, GSM, UMTS, HSPA, EV-DO, EV-DO rev. A, 3GPP LTE, WiMAX, Wi-Fi, Bluetooth, Internet, telephony, or some other communication format, including combinations thereof. Wireless communication link 113 may comprise many different signals sharing the same link. For example, wireless communication link 113 could include multiple signals operating in a single propagation path comprising multiple communication sessions, frequencies, timeslots, transportation ports, logical transportation links, network sockets, IP sockets, packets, or communication directions, including combinations thereof.

Communication links 123, 133, 134, 153, 154, and 193 use metal, air, space, optical fiber such as glass or plastic, or some other material as the transport media, including combinations thereof. Communication links 123, 133, 134, 153, 154, and 193 may use various communication protocols, such as TDM, IP, Ethernet, telephony, optical networking, hybrid fiber coax (HFC), communication signaling, wireless protocols, or some other communication format, including combinations thereof. Communication links 123, 133, 134, 153, 154, and 193 may be direct links or could include intermediate connections, networks, systems, or devices.

Figure 3:
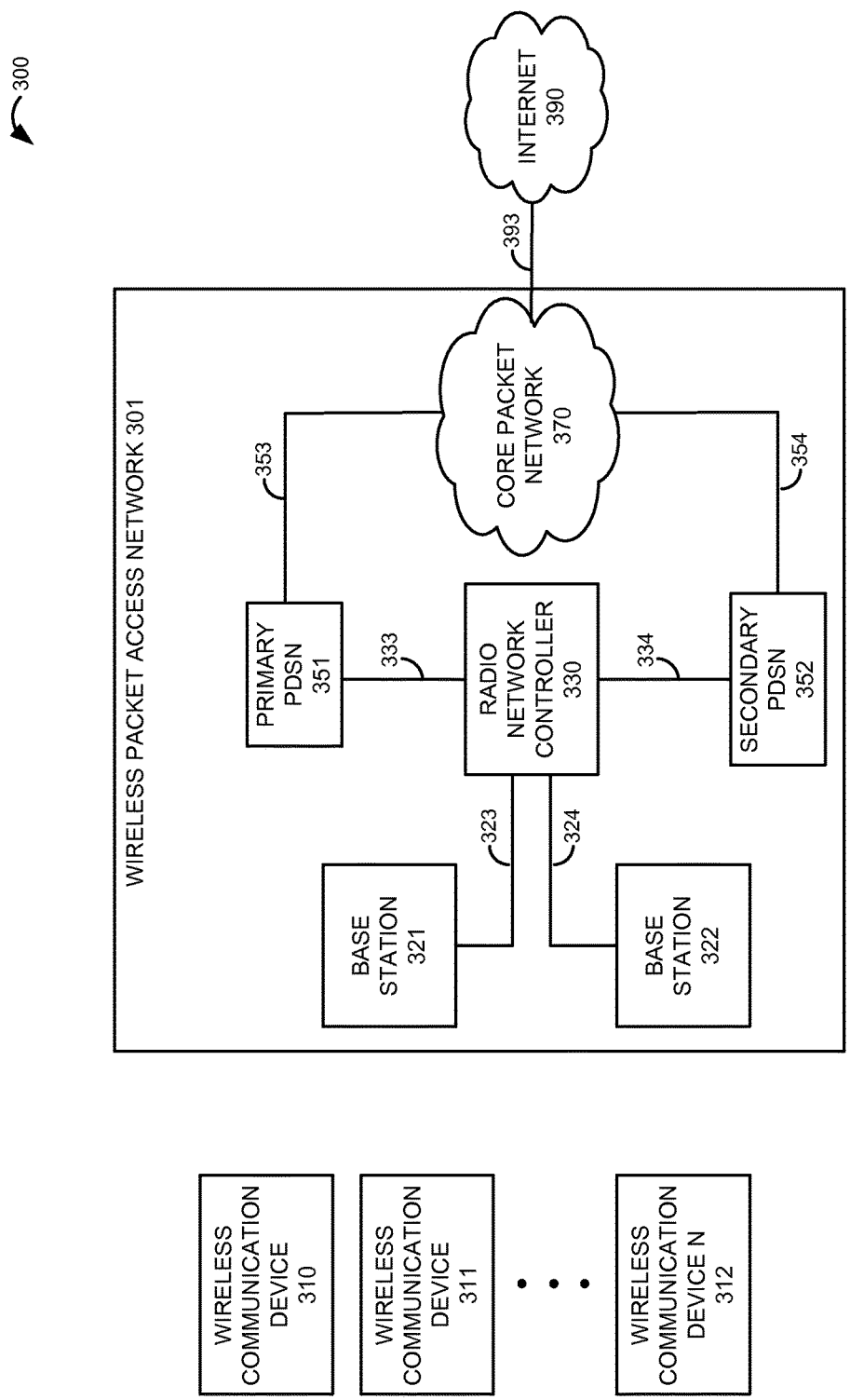
FIG. 3 illustrates an EV-DO communication system.

FIG. 3 illustrates EV-DO communication system 300. EV-DO communication system 300 is an example of wireless communication system 100, although wireless communication system 100 may be implemented in alternate forms or have alternate methods of operation. EV-DO communication system 300 comprises multiple wireless communication devices represented by wireless communication device 310, wireless communication device 311, and continuing through wireless communication device 312. EV-DO communication system 300 also comprises wireless packet access network 301 and Internet 390.

Wireless packet access network 301 includes base station 321, base station 322, radio network controller 330, primary PDSN 351, secondary PDSN 352, and core packet network 370. Base station 321 and base station 322 are examples of wireless access node 120, although wireless access node 120 may be implemented in alternate forms or operate in alternate manners. Radio network controller 330 is an example of wireless network control system 130, although wireless network control system 130 may be implemented in alternate forms or operate in alternate manners. Primary PDSN 351 and secondary PDSN 352 are examples of primary core packet network access point 151 and secondary core packet network access point 152, although primary core packet network access point 151 and secondary core packet network access point 152 may be implemented in alternate forms or operate in alternate manners.

The wireless communication devices and base stations of FIG. 3 communicate over wireless links. The base stations and radio network controller 330 communicate over link 323 and link 324. Radio network controller 330 is in communication with primary PDSN 351 and secondary PDSN 352 over link 333 and link 334 respectively. Primary PDSN 351 is in communication with core packet network 370 over link 353. Secondary PDSN 352 is in communication with core packet network 370 over link 354. Core packet network 370 and Internet 390 communicate over link 393.

EV-DO communication system 300 enables wireless communication sessions between any one of the wireless communication devices and wireless packet access network 301. In these communication sessions, packet data is communicated between, for example, wireless communication device 311 and wireless packet access network 301. Wireless communication device 311 may send packet data, receive packet data, or both. When sending packet data, the destination of the packet data sent by the wireless communication device 311 may be core packet network 370, Internet 390, or some other network. When receiving packet data, the source of the packet data sent to wireless communication device 311 may be core packet network 370, Internet 390, or some other network.

Figure 4:
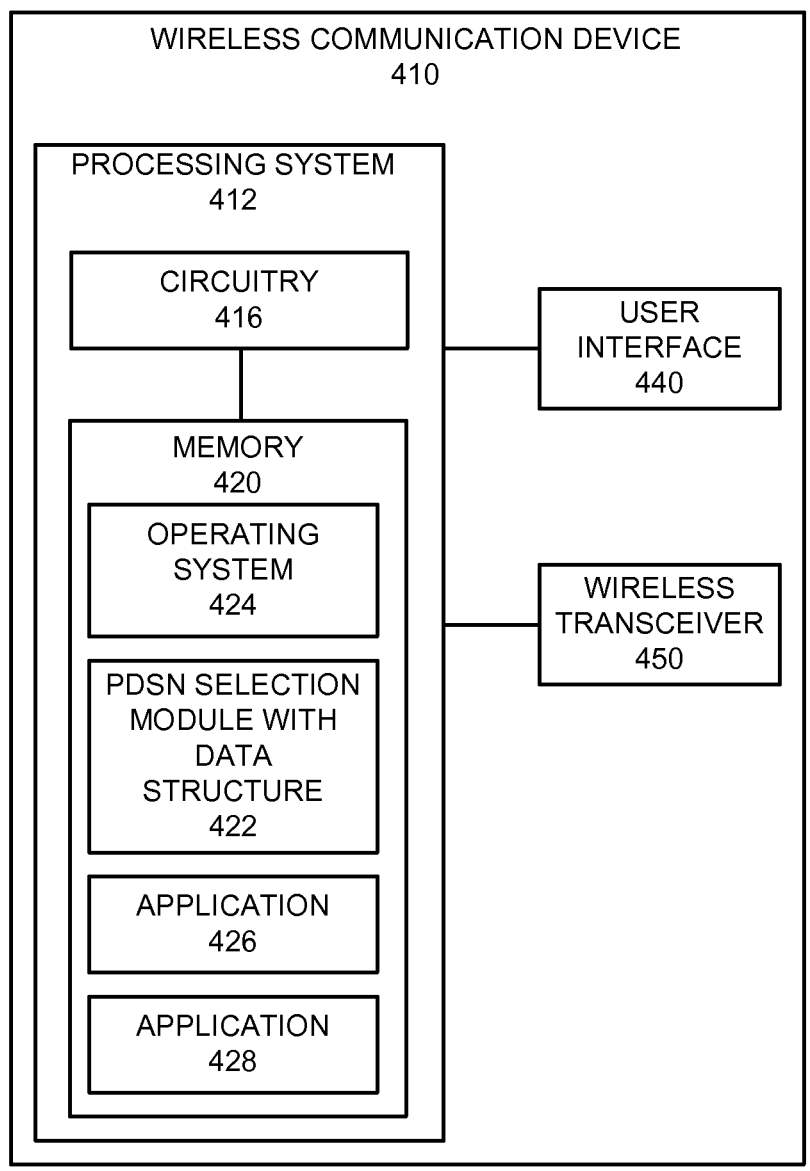
FIG. 4 illustrates a wireless communication device.

FIG. 4 illustrates wireless communication device 410. Wireless communication device 410 is an example of wireless communication device 110, although wireless communication device 110 may be implemented in alternate forms or operate in alternate manners. Wireless communication device 410 is also an example of wireless communication devices 310-312, although the wireless communication devices 310-312 may be implemented in alternate forms or operate in alternate manners. Wireless communication device 410 could be a telephone, transceiver, mobile phone, cellular phone, smartphone, computer, personal digital assistant (PDA), e-book, game console, mobile Internet device, wireless network interface card, media player, or some other wireless communication apparatus, including combinations thereof.

Wireless communication device 410 is comprised of processing system 412, user interface 440, and wireless transceiver 450. Processing system 412 is in communication with each of user interface 440 and wireless transceiver 450. Processing system 412 comprises circuitry 416 and memory 420. Memory 420 comprises operating system 424, PDSN selection module with data structure 422, application 426, and application 428. Wireless communication device 410 may include other components that are not shown for clarity, such as additional communication interfaces, enclosure, camera, power supply, and the like.

User interface 440 comprises components which interact with the user. Examples of user interface 440 include a graphic display, keys, buttons, touch-pads, speaker, microphone, and the like. The user operates the user interface to launch applications and receive data as described herein.

Wireless transceiver 450 comprises RF communication circuitry and an antenna. The RF communication circuitry typically includes an amplifier, filter, RF modulator, and signal processing circuitry of various types. Wireless transceiver 450 may use various wireless communication formats, such as CDMA, GSM, UMTS, HSPA, EV-DO, EV-DO rev. A, 3GPP LTE, WiMAX, Wi-Fi, Bluetooth, Internet, telephony, some other communication format, or a combination thereof. Wireless transceiver 450 transmits packet data requests as described herein.

Circuitry 416 comprises a microprocessor and other circuitry that retrieves and executes operating system 424 from memory 420. Memory 420 comprises a non-transitory computer-readable storage medium, such as a disk drive, flash drive, data storage circuitry, or some other memory apparatus. Memory 420 could be a single device or be distributed across multiple devices. Circuitry 416 is typically mounted on one or more circuit boards that may also hold memory 420 and portions of user interface 440 and wireless transceiver 450.

PDSN selection module with data structure 422 comprises computer programs, firmware, or some other form of non-transitory computer-readable processing instructions. PDSN selection module 422 may also include utilities, drivers, network interfaces, or some other type of software. When executed by circuitry 416, PDSN selection module 422 directs processing system 412 to determine if an application is a member of a first application group or second application group and provide information necessary to select a core packet network access point based on the membership.

Application 426 and application 428 comprise computer programs, firmware, or some other form of non-transitory computer-readable processing instructions. Some examples of wireless communication device applications which are used in this manner are Internet browsers, instant messaging services, chat services, navigation applications, map programs, social network programs, weather services, email programs, as well as many others. Application 426 and application 428 may also include utilities, drivers, network interfaces, or some other type of software. When executed by circuitry 416, the application 426 and application 428 generate packet data requests which are received at a wireless network control system.

In one example, a user of wireless communication device 410 launches application 428 by making a selection or entry through user interface 440. Processing system 412 loads application 428 from memory 420 and runs application 428 using circuitry 416. Processing system 412 also loads PDSN selection module with data structure 422 from memory 420 and executes PDSN selection module 422 using circuitry 416. PDSN selection module 422 determines if the application making the request, application 428, is a member of a first application group or a second application group. Processing system 412 then initiates a communication session with a wireless packet access network using wireless transceiver 450 by establishing an RF connection with a base station. The base station transfers the request for communication to a radio network controller. Based, at least in part, on the group membership determination, processing system 412 selects a PDSN for the communication session and transmits the packet data request along with the PDSN selection information to the radio network controller.

Application 428 may be requesting data from a network that is either internal or external to the wireless packet access network. The communication service provider which operates the wireless packet access network may offer some data services for some applications on a proprietary or internal basis. The packet data for these internal applications may be made available through an internal core packet network. For example, the communication service provider may offer a proprietary mapping program application to wireless communication device users. When the mapping program application is launched on wireless communication device 410, the PPP session is established. The requested packet data for the mapping application resides within a core packet network which is within the wireless packet access network. In this case, the packet data request does not have to reach an external network or Internet in order for the requested packet data to be retrieved.

In other examples, application 428 may be requesting packet data which is not internal or proprietary. The requested packet data may only be available on the Internet or some other external network. For example, application 428 may be an email program for which the requested packet data is not available in an internal core packet network and the packet data request must be satisfied by data which is available in or through the Internet. There may also be other criteria which dictate whether data is located in an internal core packet network, the Internet, or some other network. In some cases, the requested data may be available in multiple locations.

Packet data requests may also vary in terms of the volume of data requested, the acceptable response time for receiving the data, or other factors. In other words, the various applications which may be run on wireless communication device 410 may have significantly different network performance needs. For example, delays on the order of seconds due to network congestion may be acceptable for an email application but may be unacceptable for a real time navigation application or a music streaming application for which delays or data transfer interruptions will significantly degrade the benefit or desirability of the service to the end user.

The PPP session established for wireless communication device 410 is established using either primary PDSN 351 or secondary PDSN 352 in order to gain access to packet data in core packet network 370 or Internet 390 based on the determination made by PDSN selection module 422. It should be understood that there may be more than two application groups and data requests from applications in each of those application groups may be routed in different ways. It should also be understood that there may be more than two PDSNs and they may be grouped or associated with the application groups in a variety of ways.

Figure 5:
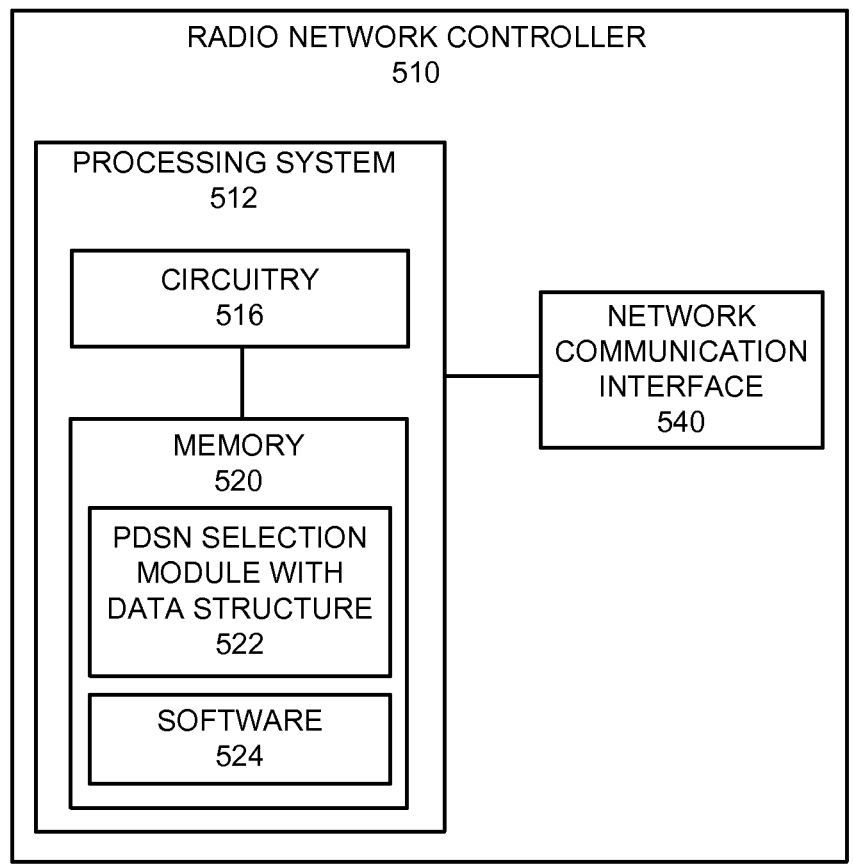
FIG. 5 illustrates a wireless radio network controller.

FIG. 5 illustrates radio network controller 510. Radio network controller 510 is an example of wireless network control system 130, although wireless network control system 130 may be implemented in alternate forms or operate in alternate manners. Radio network controller 510 is also an example of radio network controller 330, although radio network controller 330 may be implemented in alternate forms or operate in alternate manners. Radio network controller 510 is comprised of processing system 512 and network communication interface 540. Processing system 512 is in communication with network communication interface 540. Processing system 512 comprises circuitry 516 and memory 520. Memory 520 comprises software 524 and PDSN selection module with data structure 522. Radio network controller 510 may also include other components such as a server, data storage system, memory, cabling, software, and power supply. Radio network controller 510 may reside in a single device or may be distributed across multiple devices. Radio network controller 510 may be a discrete system or may be integrated within other systems.

Network communication interface 540 may comprise communication ports, signal processing circuitry, software, or some other communication components. Network communication interface 540 may use various communication protocols, such as time division multiplex, internet, Ethernet, CDMA, wireless, or some other communication format, including combinations thereof. Network communication interface 540 receives packet data requests and transmits packet data requests to core packet network access points.

Circuitry 516 comprises a microprocessor and other circuitry that retrieves and executes operating software 524 from memory 520. Memory 520 comprises a non-transitory computer-readable storage medium, such as a disk drive, flash drive, data storage circuitry, or some other memory apparatus. Memory 520 could be a single device or be distributed across multiple devices. Circuitry 516 is typically mounted on one or more circuit boards that may also hold memory 520 and portions of network communication interface 540.

PDSN selection module with data structure 522 comprises computer programs, firmware, or some other form of non-transitory computer-readable processing instructions. PDSN selection module 522 may also include utilities, drivers, network interfaces, or some other type of software. When executed by circuitry 516, PDSN selection module 522 directs processing system 512 to determine if an application is a member of a first application group or second application group and provide information necessary to select a core packet network access point based on the membership.

In one example of operation, circuitry 516 retrieves software 524 from memory 520 to operate processing system 512. Radio network controller 510 receives a packet data request from an application in a wireless communication device through network communication interface 540. Processing system 512 determines if the application is a member of a first application group or a second application group using PDSN selection module with data structure 522. PDSN selection module 522 selects a core packet network access point based on the determination of application group membership. Processing system 512 then transmits the packet data request to the selected core packet network access point through network communication interface 540.

FIG. 6 illustrates data structure 600. Data structure 600 may reside in either PDSN selection module 422 of wireless communication device 410 or within PDSN selection module 522 of radio network controller 510. Data structure 600 comprises information which lists applications, or potential applications, and associates each with an application group. Data structure 600 allows a determination to be made as to which group a particular application is associated with. Data structure 600 may include more than two application groups and may contain additional descriptive or operational information about the applications. Either processing system 412 or processing system 512 uses the group membership information to determine which PDSN or which type of PDSN should be selected when an application makes a packet data request. Alternatively, data structure 600 could identify PDSN types, or specific PDSNs, in addition to or in place of the application group membership information. Data structure 600 may exist in a variety of forms and the information in the data structure may be stored in a variety of different ways.

Membership in the application groups of data structure 600 may be assigned based upon many different characteristics of the applications. Applications related to emergency needs may be assigned to the same application group. Applications for which the user's experience is least affected by network delays may be assigned to the same application group. Applications which are internal or proprietary to the communication service provider may be assigned to the same application group. Applications may be assigned to different application groups based on a fee the end user is paying to use the application or service. Applications which necessitate access to the Internet may be assigned to the same application group. Applications requiring enhanced security may be assigned to the same application group. In addition, other characteristics may be used to categorize the applications and assign them to separate application groups.

Data structure 600 may be static, may be modified when a new application is added, may be modified when a system architecture change occurs, or may be modified frequently in response to changes in network conditions. For example, application 426 may be associated with a second application group and application 428 may be associated with a first application group as illustrated in FIG. 6. Secondary PDSN 352 may provide faster response times or be less heavily loaded than primary PDSN 351, even if only temporarily. Since application 426 is associated with the second application group, packet data requests initiated by application 426 will get the benefit of being routed through the faster responding secondary PDSN 352. Packet data requests initiated by application 428 will be routed through primary PDSN 351.

However, the circumstances in the example above may change and, as a result, there may be a desire to change how the network access points are utilized. For example, network conditions at primary PDSN 351 may become sufficiently congested or response times from core packet network 370 may become sufficiently long such that improved performance is desired for application 428. The data structure may be modified such that application 428 is also associated with the second application group and, therefore, gets the benefit of communicating through secondary PDSN 352. This modification may be left in place indefinitely or may be only a short term measure which is retracted as soon as network conditions improve.

As illustrated in previous examples, data structure 600 may reside in one of the wireless communication devices or may reside in a radio network controller. In the latter case, the radio network controller maintains the information in data structure 600 relating to all of the applications used by the various wireless communication devices which may use the network. When a packet data request arrives from wireless communication device 410, the radio network controller references data structure 600 to determine which application group the application making the request belongs to. The radio network controller then selects the appropriate PDSN with which to set up a PPP session as described previously. Data structure 600 may also comprise information which associates applications with a type or category of PDSN, or even specific PDSNs, using unique identifiers.

In the alternate case, a wireless communication device contains data structure 600. Therefore, data structure 600 need only contain information about the applications which reside on the wireless communication device. In this case, the wireless communication device makes the determination as to whether the application is a member of the first application group or the second application group. The wireless communication device transfers the results of this determination, along with the packet data request, to a radio network controller which selects a PDSN for the PPP session based on the group membership information.

In this way, different instances of an application in different wireless communication devices may be assigned to different application groups. In other words, an application may be assigned to the first application group based on the data structure which resides in a wireless communication device. At the same time, the same application may also be present in another wireless communication device and be assigned to the second application group based on the data structure which resides in the second wireless communication device. As a result, even though a packet data request originated from the same application in each of the devices, the radio network controller selects different PDSNs for each of those communication sessions. In this way, two users may be provided different levels of service even though they are both using the same application. It should also be understood that the data structures and their functions may be split between the wireless communication devices and the wireless packet access network in a variety of ways.

The data structures in wireless communication devices may also be individually modified to provide differentiated levels of service for various users or groups of users for other reasons as well. For example, the user of wireless communication device 410 may pay a fee to get prioritized service for application 428 which resides on his wireless communication device. This prioritized service may be accomplished through use of a PDSN which has faster response times or less congestion.

For example, secondary PDSN 352 may provide faster response times or be less heavily loaded than primary PDSN 351. If application 428 is a member of the first application group by default, the differentiated service is implemented by modifying the data structure in wireless communication device 410 such that application 428 is now associated with the second application group. Based on this modification, the higher priority secondary PDSN 352 will be selected by wireless packet access network 301 when a packet data request is received from application 428 in wireless communication device 410. However, a packet data request from application 428 in wireless communication device 311 will result in selection of primary PDSN 351. This is the case because the entry in the data structure in wireless communication device 311 associated with application 248 is still in the default state which associates application 428 with the first application group.

In another example, data structure 600 may be configured in a manner which causes all internal or propriety packet data requests to be routed through one PDSN while all packet requests requiring external network or Internet access are routed through a different PDSN. In this example, all packet data requests from applications in the wireless communication devices of FIG. 3 involving packet data available from core packet network 370 would be routed through one PDSN, primary PDSN 351 for example. At the same time, all packet data requests from applications involving packet data available in Internet 390 or other networks would be routed through secondary PDSN 352.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless packet access network comprising:

receiving at a wireless network control system a packet data request from an application in a wireless communication device;

determining if the application is a member of a first application group or a second application group;

selecting a core packet network access point from a plurality of core packet network access points based on whether the application is a member of the first application group or the second application group and based on a data structure which associates the application with the first application group or the second application group;

transmitting the packet data request to the selected core packet network access point to initiate access to a core packet network; and modifying the data structure to provide a different level of service to the wireless communication device by changing the application group with which the application is associated such that a different one of the plurality of core packet network access points will be selected, wherein the different one of the plurality of core packet network access points has a shorter response time than the selected core packet network access point.

2. The method of claim 1 wherein the wireless network control system is a radio network controller (RNC).

3. The method of claim 1 wherein the selected core packet network access point is a packet data serving node (PDSN).

4. The method of claim 1 further comprising establishing a point-to-point protocol (PPP) connection between the wireless communication device and the selected core packet network access point in response to the packet data request.

5. The method of claim 1 wherein modifying the data structure comprises modifying the data structure based on a network condition.

6. The method of claim 5 wherein the network condition comprises the response time of the selected core packet network access point.

7. A wireless packet access network comprising:

a plurality of core packet network access points; and a wireless network control system configured to:

receive a packet data request from an application in a wireless communication device;

determine if the application is a member of a first application group or a second application group;

select a core packet network access point from the plurality of core packet network access points based on whether the application is a member of the first application group or the second application group and based on a data structure which associates the application with the first application group or the second application group;

transmit the packet data request to the selected core packet network access point to initiate access to a core packet network; and modify the data structure to provide a different level of service to the wireless communication device by changing the application group with which the application is associated such that a different one of the plurality of core packet network access points will be selected, wherein the different one of the plurality of core packet network access points has a shorter response time than the selected core packet network access point.

8. The wireless packet access network of claim 7 wherein the wireless network control system is a radio network controller (RNC).

9. The wireless packet access network of claim 7 wherein the selected core packet network access point is a packet data serving node (PDSN).

10. The wireless packet access network of claim 7 wherein a point-to-point protocol (PPP) connection is established between the wireless communication device and the selected core packet network access point in response to the packet data request.

11. The wireless packet access network of claim 7 wherein the data structure is modified based on a network condition.

12. The wireless packet access network of claim 11 wherein the network condition comprises the response time of the selected core packet network access point.

* * * * *